United States Patent
Chenna et al.

(10) Patent No.: US 12,195,917 B2
(45) Date of Patent: Jan. 14, 2025

(54) METHOD FOR REMOVING AMMONIA FROM NON-CONDENSABLE GASES OF A PULP MILL

(71) Applicant: Valmet Technologies Oy, Espoo (FI)

(72) Inventors: Naveen Chenna, Tampere (FI); Tero Juutilainen, Tampere (FI)

(73) Assignee: VALMET TECHNOLOGIES OY, Espoo (FI)

( * ) Notice: Subject to any disclaimer, the term of this patent is extended or adjusted under 35 U.S.C. 154(b) by 176 days.

(21) Appl. No.: 17/925,478

(22) PCT Filed: May 24, 2021

(86) PCT No.: PCT/EP2021/063746
§ 371 (c)(1),
(2) Date: Nov. 15, 2022

(87) PCT Pub. No.: WO2021/239651
PCT Pub. Date: Dec. 2, 2021

(65) Prior Publication Data
US 2023/0183920 A1 Jun. 15, 2023

(30) Foreign Application Priority Data
May 27, 2020 (FI) .................................. 20205547

(51) Int. Cl.
D21C 11/08 (2006.01)
B01D 53/58 (2006.01)
D21C 11/06 (2006.01)

(52) U.S. Cl.
CPC ............. *D21C 11/08* (2013.01); *B01D 53/58* (2013.01); *D21C 11/063* (2013.01); *B01D 2251/506* (2013.01); *B01D 2257/406* (2013.01)

(58) Field of Classification Search
CPC .............................. D21C 11/063; D21C 11/08
See application file for complete search history.

(56) References Cited

U.S. PATENT DOCUMENTS

| 3,745,063 | A | 7/1973 | Fisher |
| 6,030,494 | A | 2/2000 | Hupa et al. |

(Continued)

FOREIGN PATENT DOCUMENTS

| EP | 1424435 | A2 | 6/2004 | |
| EP | 3915668 | A1 * | 12/2021 | ......... B01D 53/8637 |

(Continued)

OTHER PUBLICATIONS

Lin, Ben, Collecting and Burning Noncondensible Gases [downloaded from https://www.tappi.org/content/events/08kros/manuscripts/3-6.pdf, TAPPI Kraft Recovery Operations Course, 2008, 3.6-1 to 3.6-11. (Year: 2008).*

(Continued)

*Primary Examiner* — Anthony Calandra
(74) *Attorney, Agent, or Firm* — Alston & Bird LLP

(57) ABSTRACT

A method for removing ammonia ($NH_3$) from a gas produced in a pulp mill (100). The method comprises producing raw non-condensable gas comprising ammonia ($NH_3$) in the pulp mill (100) and transferring at least some of the raw non-condensable gas to a scrubber (200) containing aqueous scrubbing solution (130, 140). The method comprises adding a compound capable of decreasing a pH of the scrubbing solution to the scrubbing solution (130, 140) and in the scrubber (200), contacting the raw non-condensable gas with the scrubbing solution (130, 140), to react the ammonia ($NH_3$) of the raw non-condensable gas with the scrubbing solution to produce clean non-condensable gas and ammonium ($NH_4^+$). A pulp mill comprising equipment for performing the method.

15 Claims, 6 Drawing Sheets

(56) References Cited

U.S. PATENT DOCUMENTS

| | | |
|---|---|---|
| 6,517,793 B1 | 2/2003 | Tamminen et al. |
| 2010/0316553 A1 | 12/2010 | Brucher et al. |
| 2016/0122267 A1 | 5/2016 | Jemaa et al. |

FOREIGN PATENT DOCUMENTS

| | | | | |
|---|---|---|---|---|
| SE | 524106 C2 | 6/2004 | | |
| WO | WO-99/37853 A1 | 7/1999 | | |
| WO | WO-2010/016786 A1 | 2/2010 | | |
| WO | WO-2010115898 A1 * | 10/2010 | ............. | B01D 53/50 |
| WO | WO-2019/122510 A1 | 6/2019 | | |
| WO | WO-2021205060 A1 * | 10/2021 | ............... | B01J 8/18 |
| WO | WO-2021/239651 A1 | 12/2021 | | |

OTHER PUBLICATIONS

2008 TAPPI Kraft Recovery Operations Course Brochure, 2007. (Year: 2007).*

Gautreauax et al., Ammonia Scrubber for Conesate Stripper Off-Gases, 2004, 2004 International Chemical Recovery Conference. (Year: 2004).*

International Search Report and Written Opinion for International Application No. PCT/EP2021/063746, dated Sep. 8, 2021, (12 pages), European Patent Office, Rijswijk, Netherlands.

Written Opinion of the International Preliminary Examining Authority for International Application No. PCT/EP2021/063746, dated Feb. 22, 2022, (6 pages), European Patent Office, Rijswijk, Netherlands.

International Preliminary Report On Patentability for International Application No. PCT/EP2021/063746, dated Aug. 30, 2022, (36 pages), European Patent Office, Rijswijk, Netherlands.

* cited by examiner

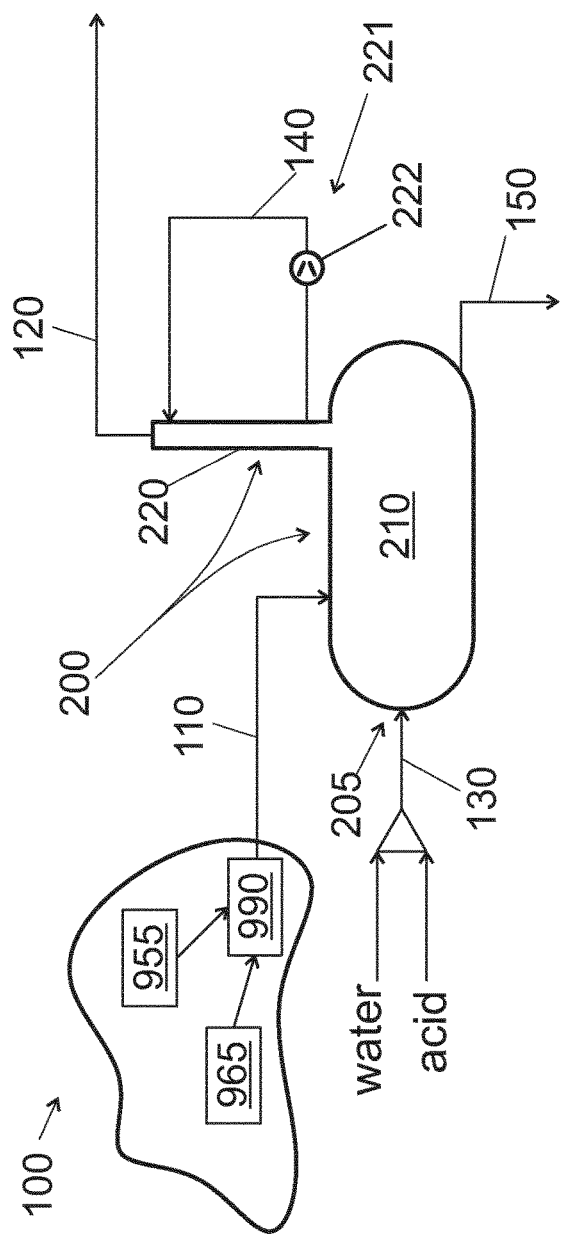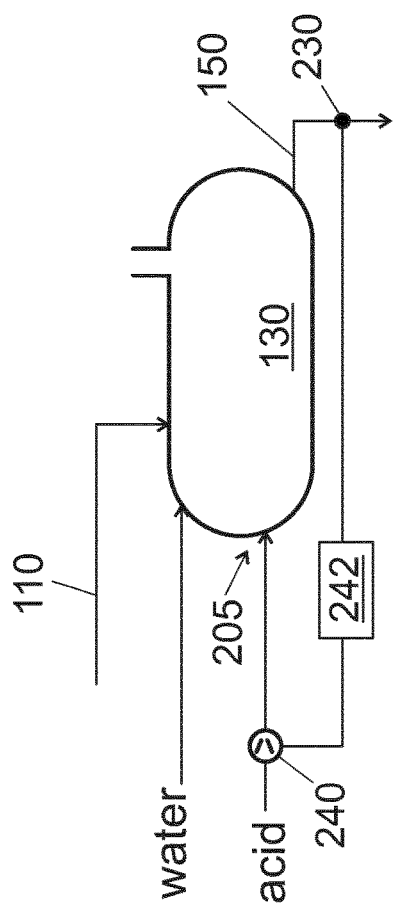

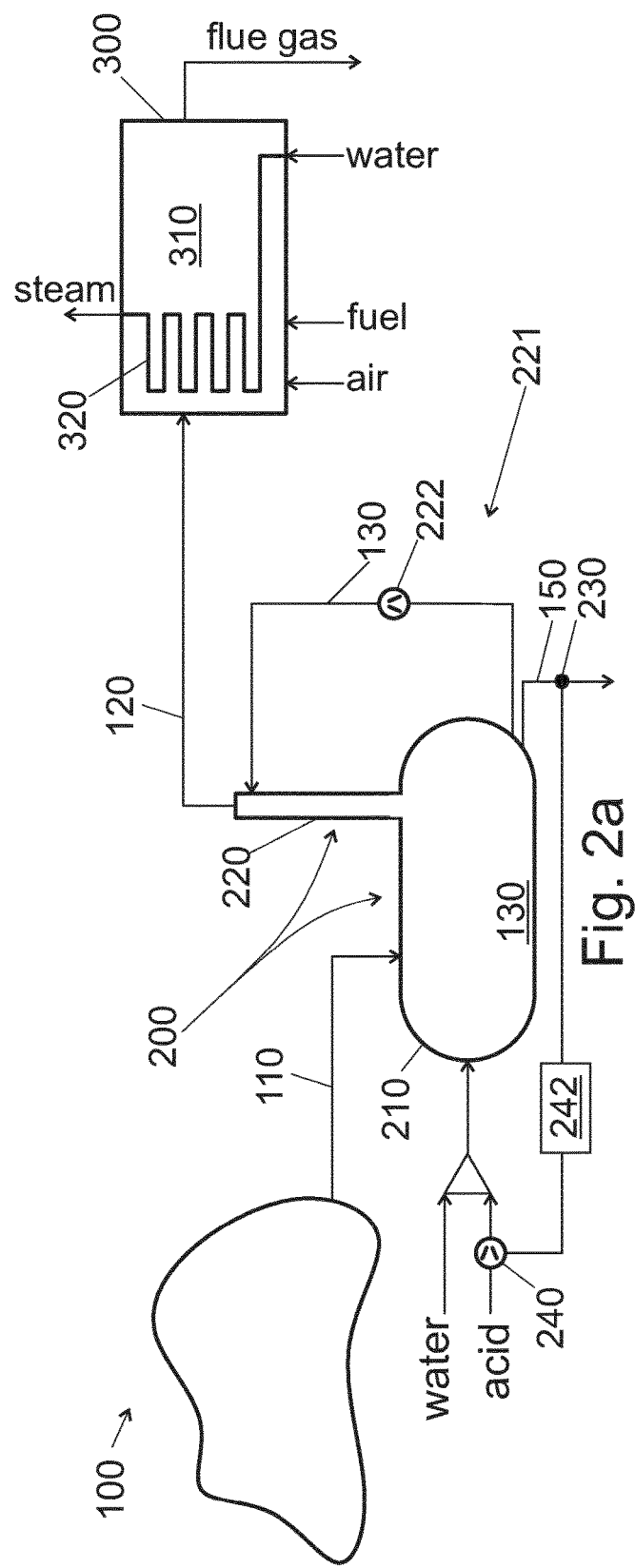
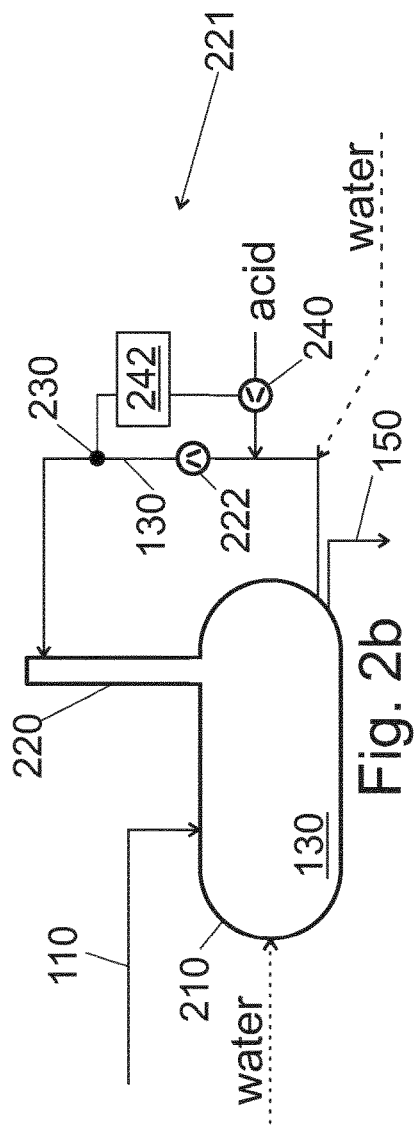
Fig. 2a
Fig. 2b

METHOD FOR REMOVING AMMONIA FROM NON-CONDENSABLE GASES OF A PULP MILL

CROSS REFERENCE TO RELATED APPLICATIONS

This application is a National Stage Application, filed under 35 U.S.C. § 371, of International Application No. PCT/EP2021/063746, filed May 24, 2021, which international application claims priority to and the benefit of Finnish Application No. 20205547, filed May 27, 2020; the contents of both of which as are hereby incorporated by reference in their entireties.

BACKGROUND

Related Field

The invention relates to treatment of odorous gases. The invention relates to treatment of odorous gases produced in a pulp process. The invention relates to reducing NOx emissions of a pulp mill. The invention relates to such systems.

DESCRIPTION OF RELATED ART

In chemical pulping, wood is treated with cooking liquor, whereby lignin is hydrolyzed. Pulping processes include sulfite and sulfate processes. In the process, several organic odorous compounds are formed, including e.g. ammonia, turpentine, methanol, hydrogen sulfide, methyl mercaptan, dimethylsulfide and dimethyldisulfide. These compounds cause the unpleasant smell of vent gases of chemical pulp mills. These gases are formed in several stages of a chemical pulping process, such as at the digester plant and the waste liquor evaporation. Malodorous compounds are removed most usually by collecting the malodorous gases from various sources and by combusting them either in a lime kiln, a chemical recovery boiler, or a separate incinerator. A purpose of combustion is to oxidize sulfur-containing substances to sulfur dioxide and/or sulfur trioxide. At the same time, burning the ammonia of these substances forms nitrogen oxides (NOx).

In chemical pulping, vapors containing these odorous compounds are released for instance in waste liquor evaporation area, e.g. black liquor, evaporation area, where said compounds can be distilled and condensed into condensates. Part of the compounds are non-condensable. Non-condensable gases (NCG) may be combusted together with the flow of other odorous gases of the mill.

The odorous gases are typically divided into strong odorous gases (LVHC, Low Volume High Concentration) and dilute odorous gases (HVLC, High Volume Low Concentration). The dilute odorous gases are sometimes referred to as DNCG (i.e. dilute non-condensable gas). Dilute gases are typically collected from atmospheric, i.e. unpressurized, parts of the pulp process. Dilute odorous gases are collected from containers and devices from the fiber line, evaporation plant, tall oil plant and causticizing plant. Dilute odorous gases contain the same components as the strong odorous gases, but they also contain so much air that the concentrations are remarkably lower.

The strong odorous gases are typically collected from some pressurized parts of the pulp process. The strong odorous gases originate mainly from a digester plant, from an evaporation plant, from stripping, from a foul condensate tank, and from a pressurized cooking liquor tank. The strong odorous gases may be classified by their origin. CNCG refers to concentrated non-condensable gas collected from the processes other than a stripper, such as an evaporator area and/or a digester area. SOG refers to stripper off gas collected from a stripper. SOG may be condensed to obtain methanol. The present invention relates in particular to combustion of strong odorous gases and/or their condensate, i.e. contaminated methanol.

A purpose of combusting odorous gas or contaminated methanol is to oxidize the sulfur compounds contained in the gas or liquid, thereby forming less odorous compounds, such as sulfur dioxide and/or sulfur trioxide. Thus, the combustion takes place in the presence of excess air. However, it has been noticed that in such conditions, the ammonia tends to react with the oxygen of the excess air, thereby forming nitrogen oxides (NOx). For environmental reasons, however, the content of nitrogen oxides should be low. In most countries, the maximum allowable content of NOx is regulated.

In the prior art, low NOx emissions are achieved by staging the combustion. In a first stage, only a sub-stoichiometric amount of air is used, which reduces the NOx formation. A method and a burner for burning odorous gases with low NOx emissions is disclosed e.g. in the document WO2019/122510.

An object of the present invention is to provide a simple method for handling odorous gases containing ammonia, wherein the combustion of odorous gases can be performed in a regular boiler without excessive NOx emissions.

BRIEF SUMMARY

It has been found that in prior art, most of the NOx formed by burning the odorous gases of prior art is formed in the combustion of the ammonia of the odorous gases. Moreover, it has been found that most of the ammonia of the odorous gases can be removed before combustion by scrubbing the odorous gases. Thus, the scrubbed odorous gases contain less ammonia than the raw odorous gas, whereby the combustion of the scrubbed odorous gases produces far less NOx than the combustion of the raw odorous gas. It has been found that scrubbing can be performed by contacting the raw odorous gas with a scrubbing solution to which has been added a compound capable of decreasing the pH of the scrubbing liquid, such as an acid. Thereafter, the scrubbed odorous gas can be burnt.

The method is disclosed in more specific terms in claim 1. A corresponding system is disclosed in more specific terms in claim 10.

The dependent claims and the description disclose preferable embodiments.

BRIEF DESCRIPTION OF THE FIGURES

FIG. 1a shows a method for removing ammonia from a gas produced in a pulp mill,

FIG. 1b shows formation of scrubbing solution and controlling a pH thereof,

FIG. 2a shows a method for removing ammonia from a gas produced in a pulp mill, wherein the same scrubbing solution is used in a tank and in a scrubbing tower, FIG. 2b shows controlling a pH of a scrubbing solution.

DETAILED DESCRIPTION OF VARIOUS EMBODIMENTS

Figure 1C:
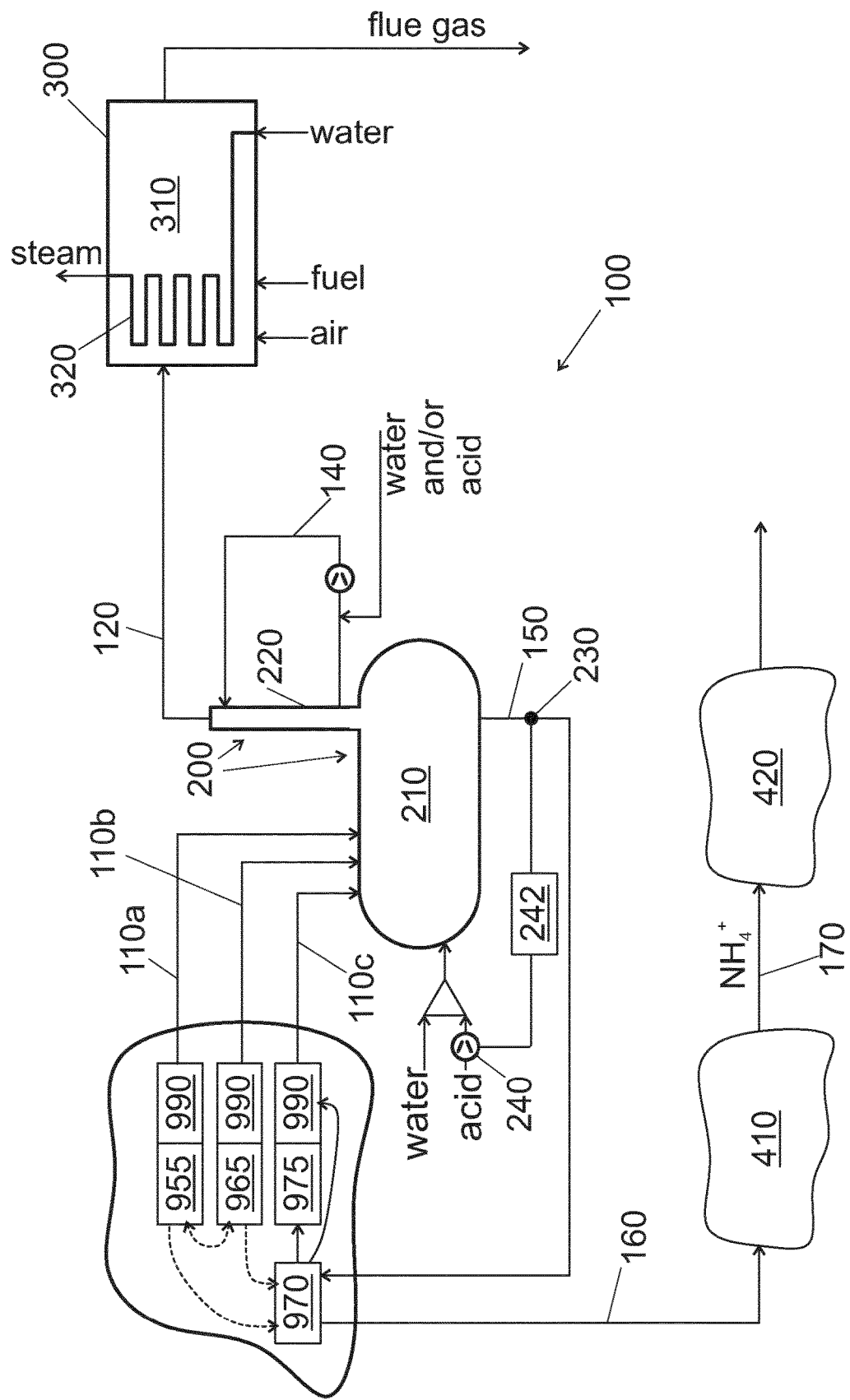
FIG. 1c shows a method for removing ammonia and Sulfur from gases produced in a pulp mill, and treatment of foul condensate.

The present invention relates to a method for removing ammonia from non-condensable gases of a pulp mill. The ammonia is removed by scrubbing. When considered feasible, the non-condensable gases before scrubbing are referred to as "raw non-condensable gases" and the remainder after the scrubbing is referred to as "clean non-condensable gases". Herein the term non-condensable gases (raw or clean) refer to such gases that are in a gaseous form at a temperature of 20° C. in a pressure of 1 atm (about 1 bar(a)).

The raw non-condensable gases comprise at least ammonia ($NH_3$). In a preferable embodiment, the raw non-condensable gases further comprise a compound comprising Sulfur. The raw non-condensable gases may comprise ammonia ($NH_3$) and at least one of hydrogen sulfide, methyl mercaptan, dimethyl sulfide, or dimethyl disulfide. In an embodiment, the raw non-condensable gases comprise at least 1000 ppm ammonia (on dry basis). Hereinafter the unit ppm refers to parts per million on mass basis, e.g. milligrams per kilograms. Moreover, when measured on dry basis, water is excluded from the measurement. In an embodiment, the raw non-condensable gases comprise at least 1000 ppm ammonia (on dry basis) and at least 20000 ppm methyl mercaptan.

As indicated in the background, strong odorous gases are produced in sulfate and/or sulfite pulping. Table 1 indicates three typical compositions of strong odorous gases in terms of the main components comprising Sulfur and the main component comprising nitrogen. The strong odorous gases are an example of raw non-condensable gases.

TABLE 1 composition of three samples of strong odorous gases.

| Compound | | molar wt | sample 1 | sample 2 | sample 3 |
|---|---|---|---|---|---|
| | | | content (ppm) | | |
| hydrogen sulphide | $H_2S$ | 34 | | 50000 | 81300 |
| methyl mercaptan | $CH_3SH$ | 48 | 80900 | 110000 | 188300 |
| dimethyl sulphide | $(CH_3)_2SH$ | 64 | 22000 | 50000 | 116000 |
| dimethyl disulphide | $(CH_3)_2S_2$ | 94 | 800 | 30000 | 3000 |
| turpentine | $C_{10}H_{16}$ | 132 | 1900 | | |
| methanol | $CH_3OH$ | 32 | | | |
| ammonia | $NH_3$ | 17 | 2000 | 2000 | 2000 |

As known in the art, to remove the odorous compounds, strong odorous gases (i.e. odorous gases) or liquids are burned to oxidize the Sulfur. However, at the same time, the ammonia produces nitrogen oxides NOx, which is harmful to the environment.

It has been found that at least some of the ammonia can be scrubbed off from the raw non-condensable gases by contacting the raw non-condensable gas with a scrubbing solution that is aqueous and to which has been added a compound capable of decreasing the pH of the scrubbing solution. In this way, clean non-condensable gas is produced.

Referring to FIG. 1a, raw non-condensable gases 110 are produced in a pulp mill 100. The pulp mill 100 comprises also the other components shown in FIG. 1a. The raw non-condensable gases 110 are conveyed to a scrubber 200 for scrubbing. In FIG. 1a, the scrubber 200 comprises a tank 210 and a scrubbing tower 220. Into the scrubber 200, an aqueous solution and a compound capable of decreasing the pH of the scrubbing solution are conveyed to form a scrubbing solution 130 into the scrubber 200. In the figures, the term "water" indicates the aqueous solution, which may be substantially pure water, or effluent from a process of the pulp mill. In the figures, the term "acid" indicates the compound capable of decreasing the pH of the scrubbing solution. In this way, the term "acid" refer to any and all compounds capable of forming hydroxonium (i.e. hydronium, $H_3O^+$) with water to the scrubbing solution. Such compounds include all kinds of acids, and also gases or solids, such as $CO_2$, that form an acid upon reacting with water.

Different scrubbing solutions may be used in different parts of the scrubber 200. A first scrubbing solution 130 may be arranged in the tank 210 of the scrubber, while a second scrubbing solution 140 be arranged to circulate in the scrubbing tower 220 of the scrubber 200. However, same scrubbing solution may be used in different parts of the scrubber.

When the pulp mill 100 comprises the scrubbing tower 220, the pulp mill also comprises a circulation 221 configured to convey scrubbing solution (in FIG. 1a the solution 140) to an upper part of the scrubbing tower 220, wherein the scrubbing solution is sprayed to form droplets of the scrubbing solution. The circulation 221 comprises a first pump 222 for the purpose. In the scrubbing tower 220, the non-condensable gas, which is being scrubbed, contacts the droplets of the scrubbing solution. It has been found that scrubbing at least in a scrubbing tower 220 is particularly efficient.

As the scrubbing solution, i.e. as one or both of the first 130 and the second 140 scrubbing solutions, an aqueous and acidic solution may be used. In the scrubber 200, the raw non-condensable gas 110 is contacted with the scrubbing solution 130, 140.

Because the scrubbing solution 130, 140 is aqueous, it comprises water ($H_2O$), of which a part naturally forms hydroxonium (i.e. hydronium, $H_3O^+$) and hydroxide ($OH^-$). When ammonia ($NH_3$) reacts with water, ammonium ($NH_4^+$) and hydroxide ($OH^-$) is produced. In order to enhance the production of ammonium ($NH_4^+$), the compound capable of forming hydroxonium with water ("acid" in the figures) is added to the scrubbing solution 130, 140. Preferably, the scrubbing solution is acidic. Preferable pH values will be given below. When the scrubbing solution 130, 140 comprises an acid, the scrubbing solution 130, 140 comprises also anions (i.e. negative ions, hereinafter denoted by $A^-$) other than hydroxide ($OH^-$). These anions ($A^-$) are the result of the acid (or more generally, the compound capable of forming hydroxonium with water) giving its proton(s) to the hydroxonium in water.

As a result of scrubbing, clean non-condensable gas 120 is produced. As indicated above, the scrubbing solution 130, 140 comprises the anions ($A^-$) of the acid of the scrubbing solution 130, 140, and ammonium ($NH_4^+$) formed from the ammonia ($NH_3$) of the raw non-condensable gas 110. The anions (A⁻) and the ammonium are collectable from the scrubber 200 in the form of foul condensate 150. Examples of the anions (A⁻) will be detailed below.

As for the acid of the scrubbing solution 130, 140, it has been found that acids comprising a reactive nonmetal atom are particularly effective. Reactive nonmetal atoms are Hydrogen (H), Carbon (C), Nitrogen (N), Oxygen (O), Fluorine (F), Phosphorous (P), Sulfur (S), Chlorine (Cl), Selenium (Se), Bromine (Br), and Iodine (I). Naturally, water is not considered as an acid, even if it comprises both hydrogen and oxide. Examples of such acids include aqueous solutions of sulfuric acid ($H_2SO_4$), nitric acid ($HNO_3$), carbon dioxide ($CO_2$), and hydrochloric acid (HCl). As an example, sulfuric acid in aqueous solution forms the anions $HSO_4^-$ and/or $SO_4^{2-}$ and nitric acid in aqueous solution forms the anion $NO_3^-$. These anions have been and will be denoted by (A⁻). Therefore, in a preferable embodiment, the scrubbing solution 130, 140 comprises hydroxonium ($H_3O^+$) and an anion (A⁻) other than hydroxide (OH⁻), the anion (A⁻) comprising an atom selected from a group consisting of Carbon (C), Nitrogen (N), Fluorine (F), Phosphorous (P), Sulfur (S), Chlorine (Cl), Selenium (Se), Bromine (Br), and Iodine (I). Preferably, the acid does not comprise a metal atom from the first group of the periodic table of elements, including Lithium (Li), Sodium (Na), and Potassium (K).

As for the scrubbing solution 130, 140, preferable an aqueous solution of sulfuric acid ($H_2SO_4$), an aqueous solution of nitric acid ($HNO_3$), an aqueous solution of carbon dioxide ($CO_2$), and/or an aqueous solution of hydrochloric acid (HCl) is used. Thus, by the aforementioned reaction, an ammonium salt solution is formed to the scrubbing solution 130, 140. Corresponding to these acids, respectively, the ammonium salt may be ammonium sulfate (($NH_4)_2SO_4$), ammonium nitrate ($NH_4NO_3$), ammonium carbonate (($NH_4)_2CO_3$), or ammonium chloride ($NH_4Cl$). In the aqueous scrubbing solution, these salts are in the form of ammonia ($NH_4^+$) and the anion (A⁻), wherein the anion is (A⁻) in these cases, respectively, is sulfate ($SO_4^{2-}$), nitrate ($NO_3^-$), carbonate ($CO_3^{2-}$), or chloride (Cl⁻). Typically sulfuric acid is naturally available from the pulp mill 100, whereby more preferably, an aqueous solution of sulfuric acid ($H_2SO_4$) is used as the scrubbing solution 130, 140, i.e. as at least one of the first 130 and the second 140 scrubbing solution. It is noted that because of the reaction, in this case, aqueous ammonium sulfate (($NH_4)_2SO_4$) is produced as the result of the reaction, and the ions of ammonium sulfate become part of the scrubbing solution 130, 140. Moreover, other impurities of the raw non-condensable gas may dissolve or otherwise remain within the scrubbing solution 130, 140. Thus, the scrubbing solution may comprise further compounds than the acid and the water. These ions and/or impurities may be removed in the form of the foul condensate 150. This applies to other aqueous acids used as the scrubbing solution, too, mutatis mutandis.

It has been found that the formation of the anion (A⁻) other than hydroxide (OH⁻) as the reaction product of the acid and the ammonia of the raw non-condensable gas 110 is most effective at a pH of about 5. Moreover, it has been found that when pH is less than 3, hydrocarbons of the raw non-condensable gas start to polymerize, which may block nozzles and/or pipelines of the scrubber 200. Therefore, the pH is preferably at least 3. In addition, the scrubbing solution's capability of capturing ammonia to the scrubbing solution is significantly lowered if the pH is more than 7.5. Therefore, in an embodiment, the scrubbing solution 130, 140 has a pH from 3 to 7.5, preferably from 4 to 6, and most preferably from 4.5 to 5.5. This applies in particular, when an aqueous solution of sulfuric acid ($H_2SO_4$) is used as the scrubbing solution 130, 140.

The pH of the scrubbing solution 130, 140 can be measured and controlled based on measurements. Thus, an embodiment comprises measuring a pH of the scrubbing solution 130, 140 and controlling a pH of the scrubbing solution 130, 140 based on the measured pH value by adding at least one of (i) the aqueous solution, which may be substantially pure water, or effluent from a process of the pulp mill ("water") and (ii) the compound capable of forming hydroxonium with water ("acid"). In particular, a flow of the compound capable of decreasing a pH of the scrubbing solution ("acid") into the scrubber 200 can be controlled. For example, if the measured pH of the scrubbing solution 130, 140 is more than a first threshold, acid can be added to the scrubbing solution in order to lower the pH of the scrubbing solution. Moreover, if the measured pH of the scrubbing solution 130, 140 is less than a second threshold, water can be added to the scrubbing solution. Typically, the ammonia as such tends to increase the pH of the scrubbing solution 130, 140 during operation, whereby acid (or other compound capable of forming hydroxonium with water) needs to be added to the process. The first threshold may be e.g. 8, 7, 6, or 5.5 (in the pH scale). The second threshold may be e.g. 3 or 4 (in the pH scale).

Preferably, if an acid is added to the scrubbing solution, a pH of the acid ("acid") that is added to the scrubbing solution 130, 140 is less than 4. Thus, the pH of the scrubbing solution can be decreased down to 4, and moreover, an excess amount of the acid is not needed for controlling the pH. More preferably, the pH of the acid that is added to the scrubbing solution 130, 140 is less than 3. The amount of added water and added acid may be selected such that the level of the scrubbing solution in the scrubber remains at proper level, and such that the pH of the scrubbing solution is within the aforementioned limits. For these reasons, the scrubber 200 comprises an inlet 205 configured to let in the compound capable of decreasing pH of the scrubbing solution of the scrubber 200, such as an acid.

In order to keep the pH of the scrubbing solution at a proper level, an embodiment of the pulp mill 100 comprises a pH sensor 230 configured to determine the pH of the scrubbing solution 130, 140. As indicated in FIGS. 1b and 1c, the pH may be measured from the foul condensate 150. Even if not shown, the pH could be measured by a sensor 230 arranged within the scrubber 200. The measured value of pH is then used to control a second pump 240 configured to feed the acid to the scrubber 200. For example, if the measured pH is more than the first threshold, the flow of acid (or other compound capable of decreasing pH) into the scrubber 200 is increased e.g. by using the second pump 240, as indicated above. For example, if the measured pH is less than the second threshold, the flow of water into the scrubber 200 is increased, as indicated above. The pulp mill 100 may comprise a controller 242 configured to control the second pump 240 as detailed above. As an alternative to the second pump 240, a valve may be used, provided that the acid (or other compound capable of decreasing pH) is stored under pressure. Thus, by opening the valve, the pressure drives the acid to the scrubber 200. The pressure may be hydrostatic, when the acid is stored at a higher vertical level. The pressure may be a pressure of the gas, if the compound capable of decreasing pH ("acid") is gaseous. As an alternative or in addition, the pressure may be generated by a pump.

Referring to FIG. 1a, constituents of the first scrubbing solution 130 may be conveyed to the tank 210 of the scrubber 200 through a single line. Referring to FIG. 1b, constituents of the first scrubbing solution 130 may be conveyed to the tank 210 of the scrubber 200 through separate lines.

As a result of the scrubbing, the clean non-condensable gas 120 comprises less ammonia that the raw non-condensable gas 110. A content of ammonia of the clean non-condensable gas 120 may be e.g. at most half of a content of ammonia of the raw non-condensable gas 110. A content of ammonia of the clean non-condensable gas 120 may be e.g. less than 1000 ppm or less than 500 ppm. It has been found that at least by using sulfuric acid in the scrubbing solution 130, 140 such that the pH of the scrubbing solution is about 5, nearly 90% of ammonia can be scrubbed off from the raw non-condensable gas.

As indicated in the background, typically the raw non-condensable gas 110 comprises a compound or compounds comprising Sulfur. Moreover, also these compounds are odorous, and they may be transformed to less odorous oxides by combustion. Therefore, and with reference to FIG. 1c, in an embodiment, at least some of the clean non-condensable gas 120 is conveyed to a furnace 310, in which the clean non-condensable gas 120 is burnt. As depicted in FIG. 1c, also air or other oxygen containing gas is fed to the furnace 310.

In particular, the furnace 310 may be a furnace of a kiln or boiler of the pulp mill 100. The kiln or the boiler may be configured to produce or recover cooking chemicals of the pulp process. Examples include lime kiln and chemical recovery boiler. In order to enhance combustion, also other fuel ("fuel") may be supplied into the furnace 310.

Preferably the heat produced by burning the clean non-condensable gas 120 is recovered by a heat exchanger 320. In this way, the furnace 310 may be a furnace of a boiler 300. In general, a boiler 300 is configured to heat and boil water to produce steam. The heat recovered in the heat exchanger 320 may be utilized as needed. One preferable way is to superheat steam in the heat exchanger 320, which in this case is a superheater of the boiler, and operate a steam turbine with the steam. Furthermore a generator can may be connected to the steam turbine to form electricity.

By burning at least the clean non-condensable gas 120 in the furnace 310, flue gas is produced. As detailed above, the flue gas may comprise Sulfur oxides (SOx), at least when the raw non-condensable gas 110 comprises a compound comprising Sulfur and a separate incinerator is used. In case the clean non-condensable gas is burnt in a chemical recovery boiler, the ash of the boiler may absorb the sulfur and/or sulfur oxides. The Sulfur oxides may be removed from flue gas as known in the art.

Even if FIGS. 1a and 1b show the raw non-condensable gas 110 as a whole, its components may be conveyed in separate lines to the scrubber 200. With reference to FIG. 1c, an embodiment of a pulp mill comprises at least one, preferably all, of an evaporator area 955, a digester area 965, and a stripper 970. Typically a part of off gas from the stripper 970, i.e. stripper off gas, is condensed in a condenser 975. The condenser 975, if used, may be considered to be comprised by the stripper 970. Typically, the stripper off gas comprises methanol, and the methanol may be condensed. However, a part of the stripper off gas is non-condensable and may form part of the raw non-condensable gases as discussed above. Each one of these (955, 965, 970, 975) may comprise a collector 990 for collecting the resulting gas and/or liquid. One or more evaporators are arranged at the evaporator area 955. The evaporator(s) of the evaporator area 955 are configured to dry a solution comprising cooking chemicals of the pulp mill. Examples of such solutions include black liquor and brown liquor. One or more digesters are arranged at the digester area 965. The digester(s) of the digester area are configured to cook raw materials of paper pulp. The stripper 970 is typically configured to strip foul condensates resulting from evaporator(s) (i.e. from the evaporator area 955) and/or digester(s) (i.e. from the digester area 965), as indicated by the dashed arrows in FIG. 1c. The gas from the evaporator area 955 can be conveyed to the stripper via the digester area 965 and vice versa, as indicated in FIG. 1c.

A first part 110a of the raw non-condensable gas 110 may be conveyed from the evaporator area 955 to the scrubber 200 through a first pipeline. A second part 110b of the raw non-condensable gas 110 may be conveyed from the digester area 965 to the scrubber 200 through a second pipeline. A third part 110c of the raw non-condensable gas 110 may be conveyed from the stripper 970 or the condenser 975 to the scrubber 200 through a third pipeline. In general, a collector 990 of the pulp mill is configured to collect raw non-condensable gas 110 (i.e. 110a and/or 110b and/or 110c), and a pipeline or pipelines is/are configured to convey the raw non-condensable gas, or parts of the raw non-condensable gas, to the scrubber 200.

FIG. 1c also shows a preferable way of handling the foul condensate 150, which comes from the scrubber 200 as a result of the scrubbing. An embodiment of the method comprises conveying foul condensate 150 from the scrubber 200 to the stripper 970. In the stripper 970, the foul condensate is cleaned to form clean condensate 160. The clean condensate 160 comprises the ammonium salt of the foul condensate 150. More specifically, the clean condensate 160 comprises ammonia ions ($NH_4^+$). In a preferable embodiment, the clean condensate 160 comprises ammonium sulfate, which is a result of the ammonia reacting with sulfuric acid. The clean condensate 160 is conveyed to pulp bleaching area 410, where pulp is bleached. The clean condensate is used in a bleaching solution in the pulp bleaching area 410 and the bleaching process. As a result of bleaching bleached pulp is produced as the main product, and bleaching effluent 170 as a side product. As indicated in FIG. 1c, the bleaching effluent 170 comprises ammonia. The bleaching effluent 170 is conveyed to a waste water treatment area 420. In the waste water treatment area 420, waste water of the pulp process is being purified.

In prior art, waste water purification requires urea as a purification chemical. However, it has been found that in the present invention, nitrogen is being supplied to the waste water treatment process and waste water treatment area 420 in the form of the ammonium ($NH_4^+$) of the bleaching effluent 170. Thus, it has been found that by removing ammonia from the CNCG as detailed above, the ammonium thus formed can be utilized in waste water treatment. Thus, an embodiment comprises purifying water by utilizing ammonium ($NH_4^+$) of the scrubbing solution 130, 140. More preferably, the water is purified without addition of any other nitrogen-containing compound. More preferably, the water is purified without addition of urea ($OC(NH_2)_2$).

A corresponding pulp mill comprises a waste water treatment area 420 and a pipeline for conveying a part of foul condensate 150 from the scrubber 200 to the waste water treatment area 420. The part of the foul condensate 150 that is conveyed to the waste water treatment area 420 comprises ammonia in an aqueous solution. Preferably, the pulp mill comprises a stripper 970 and a pipeline for conveying foul condensate 150 from the scrubber 200 to the stripper 970. The pulp mill of FIG. 1c further comprises a pulp bleaching area 410 and a pipeline for conveying clean condensate 160 from the stripper 970 to the pulp bleaching area 410. The pulp mill of FIG. 1c further comprises a waste water treatment area 420 and a pipeline for conveying bleaching effluent 170 from the pulp bleaching area 410 to the waste water treatment area 420.

What has been said above about burning the clean CNCG 120 is applicable in other embodiments, in particular those of FIGS. 2a to 4b. What has been said above about handling the foul condensate 150 is applicable in the other embodiments, in particular those of FIGS. 2a to 4b.

In the embodiment of FIGS. 1a and 1b, the second scrubbing solution 140 circulating in the scrubbing tower 220 may be aqueous. However, the compound capable of decreasing pH needs not be added to the second scrubbing solution 140, even if it is added to the first scrubbing solution 130. In a similar manner, the compound capable of decreasing pH needs not be added to the first scrubbing solution 130, even if it is added to the second scrubbing solution 140.

Figure 4A:
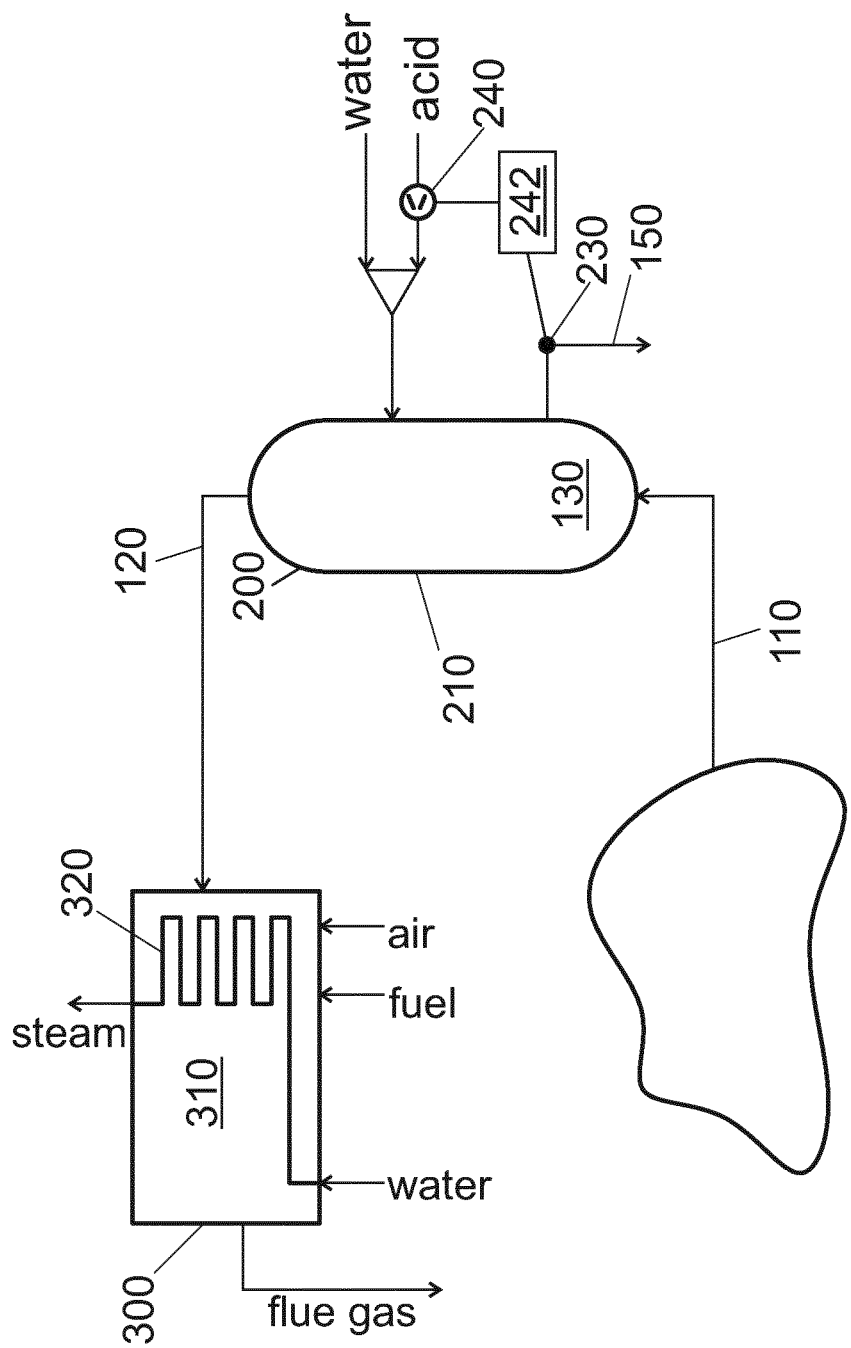
FIG. 4a shows a method for removing ammonia and Sulfur from gases produced in a pulp mill, wherein the ammonia is removed in a tank.
Figure 4B:
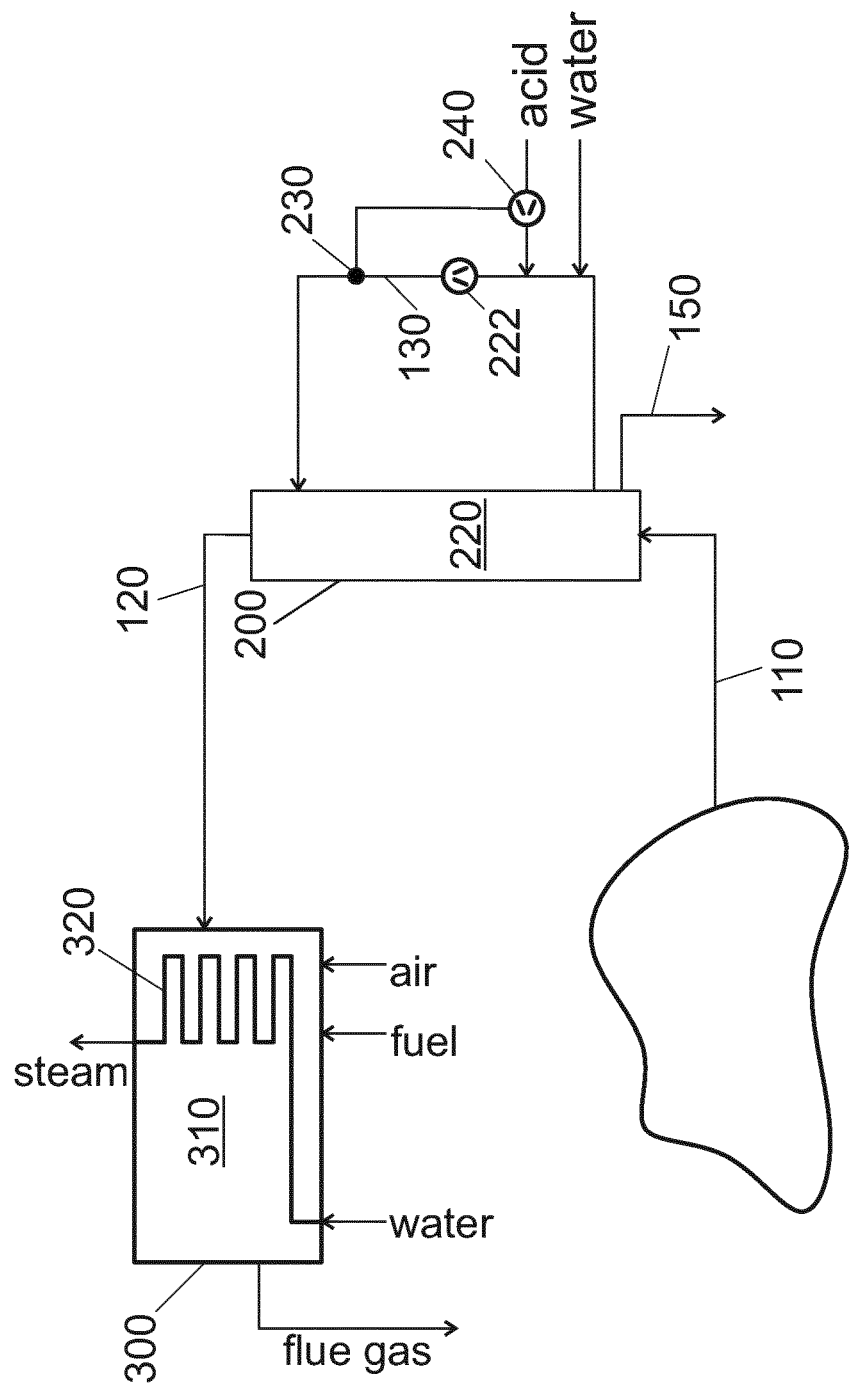
FIG. 4b shows a method for removing ammonia and Sulfur from gases produced in a pulp mill, wherein the ammonia is removed in a scrubbing tower.

With reference to FIG. 4a, the scrubber 200 needs not comprise a scrubbing tower 220. In the embodiment of FIG. 4a, the raw non-condensable gas 110 is conveyed through a bath comprising the scrubbing solution 130, 140. The bath may be arranged in a tank 210 of a scrubber 200. Acid and water may be added to the tank 210, as depicted in FIG. 4a. However, with reference to FIG. 4b, the scrubber 200 needs not comprise a tank 210. In FIG. 4b, the scrubber 400 only comprises the scrubbing tower 220. The scrubbing solution 140 is circulated by a first pump 222 and sprayed onto the non-condensable gases to be cleaned. Acid and water may be added to the circulation of the scrubbing solution, as depicted in FIG. 4b.

FIGS. 2a and 2b show an embodiment, wherein only one and the same scrubbing solution is used as the (first) scrubbing solution 130 both in the tank 210 and in the scrubbing tower 220. Referring to FIG. 2a, water and acid may be fed to the tank 210 in order to form the scrubbing solution 130 into the tank 210. The pulp mill 100 comprises a circulation 221 configured to convey scrubbing solution to an upper part of the scrubbing tower 220, wherein the scrubbing solution is sprayed to form droplets of the scrubbing solution 130. In the scrubbing tower 220, the non-condensable gas, which is being scrubbed, contacts the droplets of the scrubbing solution 130. The droplets may be formed by a nozzle or nozzles (not shown) of the scrubbing tower 220. The first pump 222 is used to circulate the scrubbing solution to the upper part of the scrubbing tower 220.

In FIG. 2a, the first pump 222 receives the scrubbing solution 130 from the tank 210. In FIG. 2b, the first pump 222 receives the scrubbing solution 130 from the tank 210, but before the scrubbing solution is conveyed to the scrubbing tower 220, some acid, and optionally some water, may be added thereto. To form the scrubbing solution 130, the water may be added to the tank 210 and/or to the circulation 221. To form the scrubbing solution, the acid may be added to the tank 210 and/or to the circulation 221.

Using a scrubbing tower 220 has been found beneficial, since the droplets of the scrubbing solution have a high surface area, whereby the reaction efficiency between the ammonia and the hydroxonium of the scrubbing solution is increased. A tank 210 may be, but need not be, used in addition. Thus, an embodiment of the method comprises, spraying the scrubbing solution to form droplets of the scrubbing solution in the scrubber, and contacting the non-condensable gas comprising ammonia with the droplets of the scrubbing solution. Herein the non-condensable gas may be partially cleaned, since the system may comprise the tank 210 before the scrubbing tower 220. Moreover in an embodiment of a pulp mill, the scrubber 200 comprises the circulation 221, i.e. a circulation for the scrubbing solution, which is, in use, a circulation of the scrubbing solution. In the circulation 221, the scrubbing solution is configured to be sprayed to form droplets of the scrubbing solution 130. Moreover, in the scrubber 200, the non-condensable gas comprising ammonia is configured to contact the droplets of the scrubbing solution. Also here, the non-condensable gas comprising ammonia may be partly cleaned in the tank 210 before the tower 220.

In order to control the pH, in the embodiments of FIGS. 2a and 2b, a sensor 230 is configured to determine the pH of the scrubbing solution 130. The pH may be determined e.g. from the circulation 221, as in FIG. 2b. In the alternative or in addition, the pH may be measured from the foul condensate 150 (as in FIG. 2a). In the alternative or in addition, the pH may be measured from the tank 210 and/or from the scrubbing tower 220 (not shown). The measured pH value may be utilized as detailed above. For example, the controller 242 may control the second pump 240 as detailed above.

Figure 3:
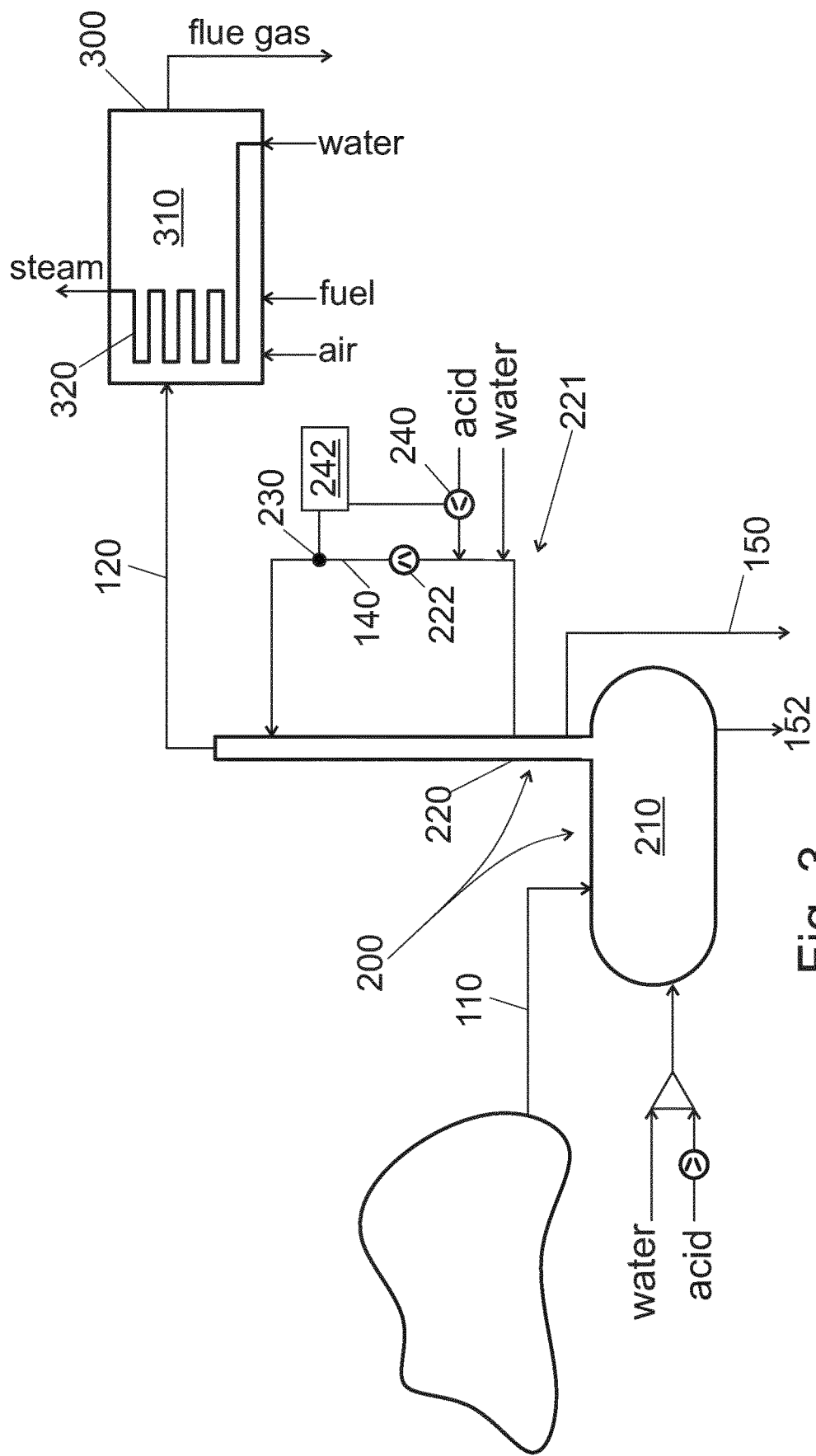
FIG. 3 shows a method for removing ammonia and Sulfur from gases produced in a pulp mill, wherein the ammonia is removed in a scrubbing tower of a scrubber comprising also a tank.

Referring to FIG. 3, the circulation 221 of the scrubbing tower 220 may be separated from the scrubbing solution of the tank 221. In this embodiment, the pulp mill comprises the circulation 221, which is configured to convey second scrubbing solution 140 to the upper part of the scrubbing tower 220, wherein the second scrubbing solution 140 is sprayed to form droplets of the second scrubbing solution 140. In the scrubbing tower 220, the non-condensable gas, which is being scrubbed, contacts the droplets of the second scrubbing solution 140. The droplets may be formed by a nozzle or nozzles (not shown) of the scrubbing tower 220. The first pump 222 is used to circulate the second scrubbing solution 140 to the upper part of the scrubbing tower 220. In FIG. 3, the compound capable of decreasing pH is added to the second scrubbing solution 140, which is aqueous. Acid needs not be added to the first scrubbing solution 130, which is arranged in the tank 210, but may be added, as indicated in FIG. 3.

In FIG. 3, the first pump 222 receives some of the second scrubbing solution 140 from a lower part of the scrubbing tower 220. In FIG. 3, the first pump 222 receives some of the second scrubbing solution 140 from the lower part of the scrubbing tower 220, but before the second scrubbing solution 140 is conveyed to the scrubbing tower 220, some acid, and optionally some water, may be added thereto. In addition, the foul condensate 150 may be removed from a lower part of the scrubbing tower 220. In the alternative, the foul condensate may be let to flow to the tank 210. The foul condensate 150 may be used as indicated above or as indicated in connection with FIG. 1c.

In FIG. 3, the second scrubbing solution 140 of the circulation 221 is aqueous and preferably acidic, as detailed above. Moreover, a first scrubbing solution 130 is utilized in the tank 210. Preferably, the first scrubbing solution 130 is aqueous. However, the first scrubbing solution 130 need not be acidic. However, also the first scrubbing solution 130 may be acidic. A secondary foul condensate 152 may be let out from the tank 210 and drained or processed as needed. The secondary foul condensate 152 may be used as indicated above or as indicated in connection with FIG. 1c for the foul condensate 150. The foul condensate 150 of FIG. 3 may be utilized as indicated in connection with FIG. 1c.

As detailed in FIG. 4a, the scrubber 200 needs not comprise the circulation 221 of the FIGS. 1a to 3. Thus, in FIG. 4a, the scrubber 200 comprises the tank 210, but not the scrubbing tower 220. In use, the tank 210 is filled to a proper level with the scrubbing liquid 130, which is aqueous and preferably acidic as detailed above. The raw non-condensable gas 110 is conveyed to a lower part of the scrubber 200, whereby bubbles of the raw non-condensable gas are formed within the scrubber solution 130 that is arranged in the scrubber 200. Thus, the raw non-condensable gas 110 reacts with the scrubbing solution 130 as detailed above. As a result, clean non-condensable gas 120 can be collected from an upper part of the scrubber 200 and, if feasible, processed as detailed above. The processing preferably includes at least combustion, as shown in FIG. 4a, and optionally also sulfur removal, as detailed above. The foul condensate 150 may be used as indicated above or as indicated in connection with FIG. 1c. However, as detailed above, in a preferable embodiment, the scrubbing solution 130, 140 is sprayed onto the non-condensable gases to be scrubbed.

As detailed in FIG. 4b, the scrubber 200 need not comprise the tank 210 of the FIGS. 1a to 4a. Thus, scrubber 200 of FIG. 4b comprises the scrubbing tower 220 and the circulation 221, but does not comprise the tank 210. The circulation 221 is configured to convey scrubbing solution 130 to an upper part of the scrubbing tower 220, wherein the scrubbing solution is sprayed to form droplets of the scrubbing solution. The circulation 221 comprises a first pump 222 for the purpose. In the scrubbing tower 220, the non-condensable gas, which is being scrubbed, contacts the droplets of the scrubbing solution. In FIG. 4b, the first pump 222 receives some of the scrubbing solution 130 from a lower part of the scrubbing tower 220. In FIG. 4b, the first pump 222 receives some of the scrubbing solution 130 from the lower part of the scrubbing tower 220, but before the scrubbing solution 130 is conveyed to the scrubbing tower 220, some acid, and optionally some water, may be added thereto. In addition, the foul condensate 150 may be removed from a lower part of the scrubbing tower 220. The foul condensate 150 may be used as indicated above or as indicated in connection with FIG. 1c. Clean non-condensable gas 120 can be collected from an upper part of the scrubber 200 and, if feasible, processed as detailed above. The processing preferably includes at least combustion, as shown in FIG. 4b, and optionally also sulfur removal, as discussed above.

The invention claimed is:

1. A method for removing ammonia ($NH_3$) from a gas produced in a pulp mill, the method comprising:
    producing raw non-condensable gas comprising ammonia ($NH_3$) in the pulp mill,
    transferring at least some of the raw non-condensable gas to a scrubber containing aqueous scrubbing solution,
    in the scrubber, contacting the raw non-condensable gas with the scrubbing solution, to react the ammonia ($NH_3$) of the raw non-condensable gas with the scrubbing solution to produce clean non-condensable gas and foul condensate comprising ammonium ($NH_4^+$),
    adding a compound capable of decreasing a pH of the scrubbing solution to the scrubbing solution,
    measuring a pH of the scrubbing solution,
    controlling a pH of the scrubbing solution based on the measured pH value by controlling a flow of the compound capable of decreasing a pH of the scrubbing solution to the scrubber,
    in the scrubber, spraying the scrubbing solution to form droplets of the scrubbing solution,
    contacting the non-condensable gas comprising ammonia with the droplets of the scrubbing solution,
    conveying the foul condensate from the scrubber to a stripper,
    stripping the foul condensate to produce clean condensate,
    conveying the clean condensate to a pulp bleaching area,
    bleaching pulp in the pulp bleaching area using the clean condensate to produce bleached pulp and bleaching effluent,
    conveying the bleaching effluent to a wastewater treatment area, and
    purifying water in the wastewater treatment area using the bleaching effluent,
    wherein:
        the bleaching effluent comprises ammonium ($NH_4^+$),
        the compound capable of decreasing a pH of the scrubbing solution comprises sulfuric acid ($H_2SO_4$) and
        a pH of the scrubbing solution is from 4.5 to 5.5.

2. The method of claim 1, further comprising the steps of:
    determining that the measured pH value exceeds a first threshold, and
    adding acid to the scrubbing solution.

3. The method of claim 2, wherein a pH of the acid is less than 4.

4. The method of claim 2, wherein the first threshold is 5.5.

5. The method of claim 1, wherein:
    the raw non-condensable gas comprises at least 1000 ppm ammonia ($NH_3$), and
    a content of ammonia of the raw non-condensable gas is higher than a content of ammonia of the clean non-condensable gas.

6. The method of claim 5, wherein a content of ammonia of the clean non-condensable gas is less than 1000 ppm.

7. The method of claim 1, wherein the raw non-condensable gas comprises at least a compound comprising Sulfur.

8. The method of claim 7, wherein the raw non-condensable gas comprises at least one of hydrogen sulfide, methyl mercaptan, dimethyl sulfide, and dimethyl disulfide.

9. The method of claim 7, wherein the raw non-condensable gas comprises at least 20000 ppm methyl mercaptan on dry basis.

10. The method of claim 7, wherein the raw non-condensable gas comprises at least 1000 ppm ammonia on dry basis and at least 20000 ppm methyl mercaptan on dry basis.

11. The method of claim 1, further comprising the steps of:
    conveying at least some of the clean non-condensable gas to a furnace, and
    burning the at least some of the clean non-condensable gas in the furnace.

12. The method of claim 11, further comprising the step of burning, in addition to the clean non-condensable gas, also other fuel in the furnace.

13. The method of claim 12, further comprising the step of recovering heat from the furnace by using a heat exchanger.

14. The method of claim 13, further comprising the step of utilizing the recovered heat to operate a steam turbine.

15. The method of claim 1, wherein the water is purified without addition of other nitrogen-containing compound, the other nitrogen-containing compound being urea.

* * * * *

UNITED STATES PATENT AND TRADEMARK OFFICE
CERTIFICATE OF CORRECTION

| | | |
|---|---|---|
| PATENT NO. | : 12,195,917 B2 | Page 1 of 1 |
| APPLICATION NO. | : 17/925478 | |
| DATED | : January 14, 2025 | |
| INVENTOR(S) | : Naveen Chenna et al. | |

It is certified that error appears in the above-identified patent and that said Letters Patent is hereby corrected as shown below:

On the Title Page

In Column 2, item (57), Abstract, Line 8, delete "scmbbing solution" and insert -- scrubbing solution --, therefor.

In Column 2, item (57), Abstract, Line 10, delete "scmbbing solution" and insert -- scrubbing solution --, therefor.

In Column 2, item (57), Abstract, Lines 11-12, delete "scmbbing solution" and insert -- scrubbing solution --, therefor.

Signed and Sealed this
Twenty-second Day of April, 2025

Coke Morgan Stewart
*Acting Director of the United States Patent and Trademark Office*